US012675367B2

(12) United States Patent
Ableidinger et al.

(10) Patent No.: US 12,675,367 B2
(45) Date of Patent: Jul. 7, 2026

(54) CYCLE ACCURATE TRACING OF VECTOR INSTRUCTIONS

(71) Applicant: SiFive, Inc., Santa Clara, CA (US)

(72) Inventors: Bruce Ableidinger, San Mateo, CA (US); Ernest L. Edgar, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 33 days.

(21) Appl. No.: 18/758,980

(22) Filed: Jun. 28, 2024

(65) Prior Publication Data

US 2024/0338277 A1 Oct. 10, 2024

Related U.S. Application Data

(63) Continuation of application No. PCT/US2022/051160, filed on Nov. 29, 2022.
(Continued)

(51) Int. Cl.
*G06F 9/30* (2018.01)
*G06F 11/14* (2006.01)
(Continued)

(52) U.S. Cl.
CPC ...... *G06F 11/1407* (2013.01); *G06F 9/30036* (2013.01); *G06F 11/364* (2013.01)

(58) Field of Classification Search
CPC ............. G06F 9/30036; G06F 11/1407; G06F 11/3636; G06F 11/3648; G06F 11/3466; G06F 11/3476
See application file for complete search history.

(56) References Cited

U.S. PATENT DOCUMENTS 6,643,767 B1 * 11/2003 Sato ...................... G06F 9/3838
712/E9.05
9,026,769 B1 * 5/2015 Jamil .................... G06F 9/3836
712/E9.058
(Continued)

OTHER PUBLICATIONS

He , "Superscalar RISC-V Processor with SIMD Vector Extension", A Thesis Submitted to the College of Graduate and Postdoctoral Studies in Partial Fulfillment of the Requirements for the Degree of Master of Science in the Department of Electrical and Computer Engineering, Aug. 31, 2020, pp. 1-98.
(Continued)

*Primary Examiner* — Jacob Petranek
(74) *Attorney, Agent, or Firm* — Kilpatrick Townsend & Stockton LLP

(57) ABSTRACT

Systems and methods are disclosed for cycle accurate tracing of vector instructions. For example, a system may include a vector unit in communication with a scalar core. The vector unit may include a vector instruction queue that receives vector instructions from the scalar core. The vector unit may also include a vector execution unit that executes vector instructions from the vector instruction queue. The system may also include checkpoints in the vector unit including a first checkpoint including circuitry that sets a first bit for a first clock cycle in which a first vector instruction exits the vector instruction queue, and a second checkpoint including circuitry that sets a second bit for a second clock cycle in which a second vector instruction exits the vector execution unit.

20 Claims, 10 Drawing Sheets

Related U.S. Application Data

(60) Provisional application No. 63/295,682, filed on Dec. 31, 2021.

(51) Int. Cl.
  *G06F 11/36* (2025.01)
  *G06F 11/362* (2025.01)

(56) References Cited

U.S. PATENT DOCUMENTS

| | | | | |
|---|---|---|---|---|
| 10,853,070 B1 * | 12/2020 | Shalev | ................... | G06F 9/383 |
| 2004/0148493 A1 * | 7/2004 | Chu | ...................... | G06F 9/3836 |
| | | | | 712/214 |
| 2012/0204008 A1 * | 8/2012 | Dockser | ................ | G06F 9/3814 |
| | | | | 712/214 |
| 2015/0227368 A1 * | 8/2015 | Gonion | .............. | G06F 9/30036 |
| | | | | 712/7 |

OTHER PUBLICATIONS

Panesar et al., "Efficient Trace for RISC-V Version 1.1.3-Frozen", Available Online at: https://tools.cloudbear.ru/docs/riscv-trace-spec-1.1.3-20211102.pdf, Nov. 2, 2021, pp. 1-116.
PCT/US2022/051160 , "International Preliminary Report on Patentability", Jul. 11, 2024, 7 pages.
PCT/US2022/051160 , "International Search Report and the Written Opinion", Mar. 15, 2023, 9 pages.

\* cited by examiner

CAPTURE BITS AT CHECKPOINTS IMPLEMENTED IN A PROCESSOR THAT INCLUDES A VECTOR UNIT IN COMMUNICATION WITH SCALAR CORE

704

STORE CAPTURED BITS IN A TRACE BUFFER

706

ASSOCIATE VECTOR INSTRUCTIONS WITH CAPTURED BITS

708

OUTPUT TO A DISPLAY VECTOR INSTRUCTION TRACES WITH CYCLE ACCURATE TIMING

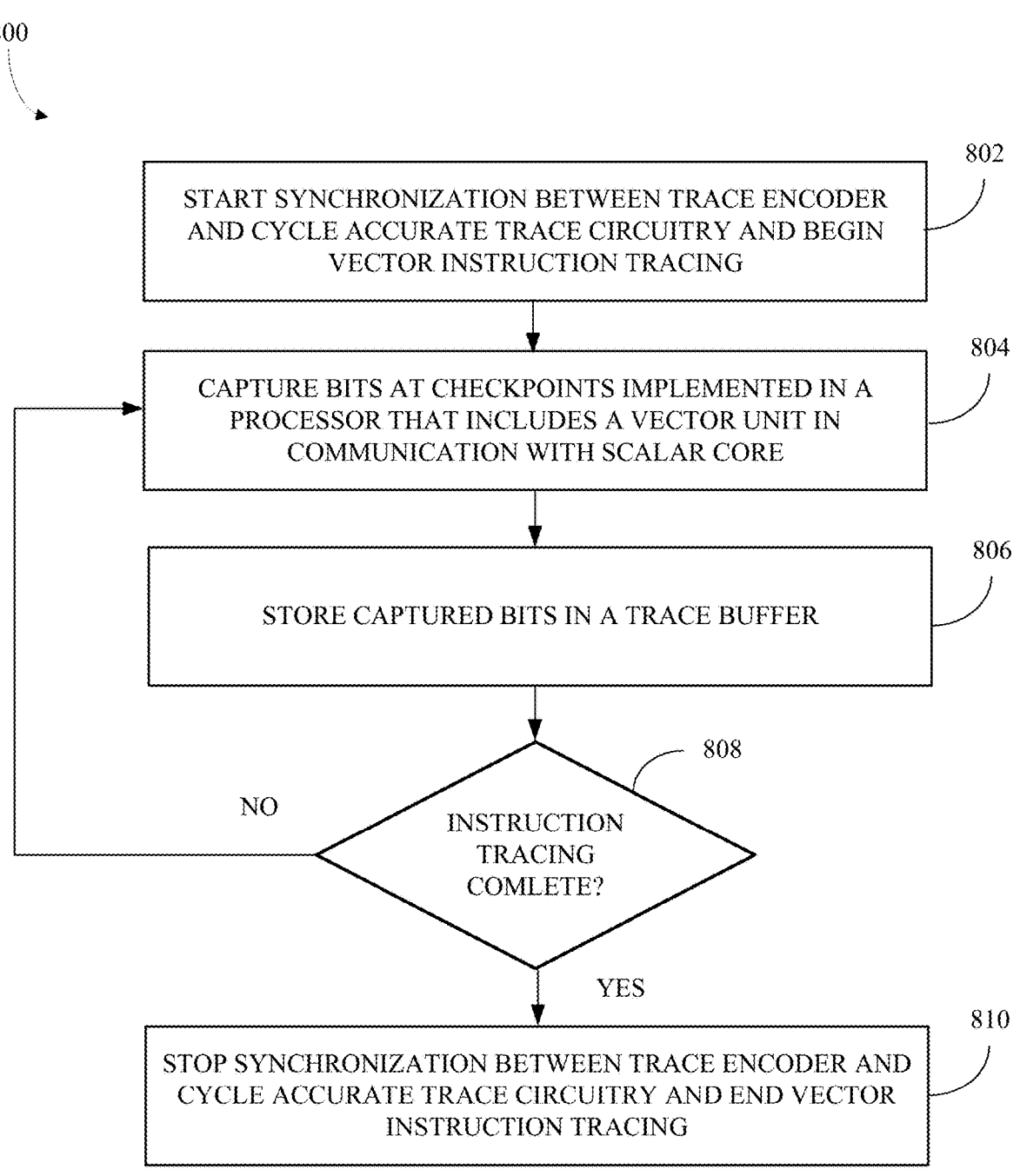

800

802

START SYNCHRONIZATION BETWEEN TRACE ENCODER AND CYCLE ACCURATE TRACE CIRCUITRY AND BEGIN VECTOR INSTRUCTION TRACING

804

CAPTURE BITS AT CHECKPOINTS IMPLEMENTED IN A PROCESSOR THAT INCLUDES A VECTOR UNIT IN COMMUNICATION WITH SCALAR CORE

806

STORE CAPTURED BITS IN A TRACE BUFFER

808

NO

INSTRUCTION TRACING COMLETE?

YES

810

STOP SYNCHRONIZATION BETWEEN TRACE ENCODER AND CYCLE ACCURATE TRACE CIRCUITRY AND END VECTOR INSTRUCTION TRACING

CAPTURE BITS AT CHECKPOINTS IMPLEMENTED IN A PROCESSOR THAT INCLUDES A VECTOR UNIT IN COMMUNICATION WITH SCALAR CORE

904

COMPRESS CAPTURED BITS

906

STORE COMPRESSED BITS IN A TRACE BUFFER

CYCLE ACCURATE TRACING OF VECTOR INSTRUCTIONS

CROSS-REFERENCES TO RELATED APPLICATIONS

This application is a continuation of International Application No. PCT/US2022/051160, filed Nov. 29, 2022, which claims priority to U.S. Provisional Application No. 63/295,682, filed Dec. 31, 2021, the entire contents of which are incorporated herein by reference for all purposes.

FIELD OF TECHNOLOGY

This disclosure relates generally to integrated circuits, and more specifically, to cycle accurate tracing of vector instructions.

BACKGROUND

Instruction tracing is a technique used to analyze the history of instructions executed by a processor. Information associated with one or more instructions may be collected from a processor executing the instructions. The information collected may be analyzed to determine system performance and to help identify possible optimizations for improving the system.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a block diagram of an example of a system for cycle accurate tracing of vector instructions.

FIG. 8 is a flow chart of an example of a process for synchronizing cycle accurate trace circuitry with tracing of vector instructions.

DETAILED DESCRIPTION OF THE INVENTION

Figure 2:
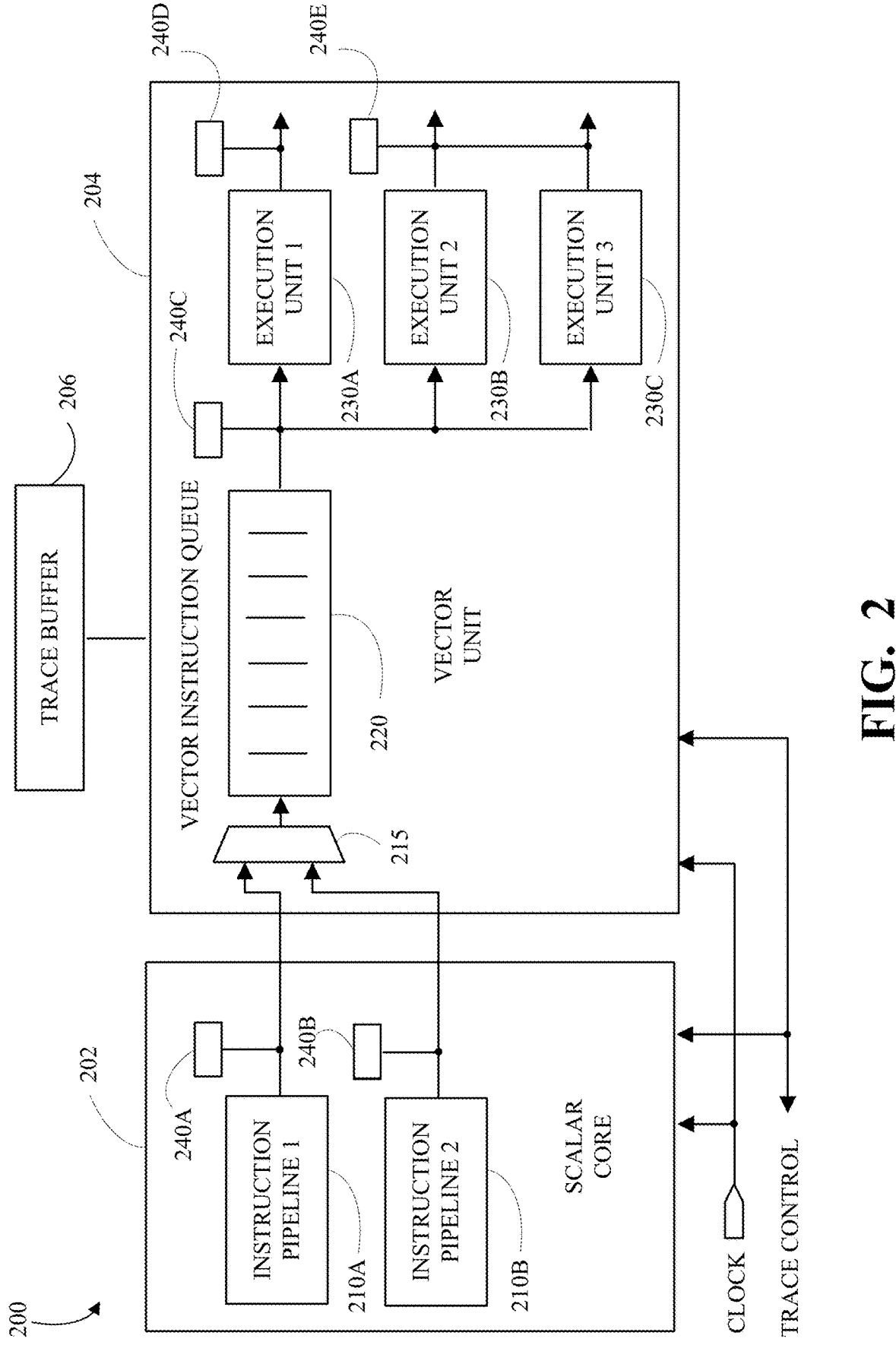
FIG. 2 is a block diagram of another example of a system for cycle accurate tracing of vector instructions.

A processor may be implemented with a scalar core (also referred to as an "integer unit") and a vector unit connected to the scalar core. The scalar core may have one or more scalar execution units in instruction pipelines for executing scalar instructions which operate on one data element at a time. The vector unit may have a vector instruction queue and one or more vector execution units for executing vector instructions which operate on multiple data elements at the same time. In operation, the scalar core may fetch, decode, execute, and retire scalar instructions, and may fetch and dispatch vector instructions to the vector unit for execution by the vector unit. The vector unit, in turn, may receive the vector instructions from the scalar core and may queue, execute, and retire the vector instructions.

It may be useful to investigate the performance of scalar and vector instructions being executed, such as the timing in which instructions complete their execution. Understanding the timing in which instructions execute may allow an engineer to identify delays or stalls in the processor and/or other aspects of performance that may be utilized for improving the design of the processor. One technique for determining the timing of instructions is to implement circuitry in silicon which measures the clock cycles in which instructions complete through the scalar core. However, this technique may provide only limited information with regard to vector instructions, such as the timing in which the vector unit receives the instructions. This technique may not provide information about instructions moving through the vector unit, such as delays associated with queuing vector instructions prior to their execution, or delays associated with completion of vector instructions through the vector unit. Further, this technique may utilize resources of the system under test, for example if the measurements being taken are routed and stored in hardware.

Another technique for determining the timing of instructions being executed is to simulate the movement of the instructions in a simulation environment. A simulation environment can measure the timing of instructions moving through the scalar core and/or the vector unit with less burden to the system by adding general purpose computing resources. However, while simulation may be useful, timing obtained from a simulation environment may have some differences when compared to timing obtained from an implementation in silicon—in other words true cycle accurate timing may not be available through simulation. Accordingly, there is a need for accurately determining the timing of vector instructions moving through a vector unit with minimal burden to the system.

Described herein are techniques for cycle accurate tracing of vector instructions in which the timing of instructions moving through various points of a vector unit may be accurately determined in silicon with a compact amount of data associated with the measurements being taken. A group of checkpoints, such as circuitry comprising latches or flip-flops, may be implemented in certain points of a processor including a vector unit implemented in silicon. The checkpoints may include: a first checkpoint including circuitry that sets a first bit for a first clock cycle in which a first vector instruction exits a vector instruction queue, and a second checkpoint including circuitry that sets a second bit for a second clock cycle in which a second vector instruction exits a vector execution unit (or retires from the vector unit). Another checkpoint may be implemented using circuitry that sets a third bit for a third clock cycle in which a third vector instruction is dispatched from the scalar core to the vector instruction queue. Depending on the situation, the first, second, and third clock cycles may refer to the same or two or three different clock cycles and the first, second, and third vector instructions may refer to the same instance of a vector instruction or two or three different instances of vector instructions. Each vector execution unit may be implemented by the vector core for a predetermined purpose, such as arithmetic, load, and store units implemented for arithmetic, load, and store operations associated with vector instructions, respectively. During a capture period, bits associated with the checkpoints may be captured for a number of clock cycles and stored in a trace buffer, such as a local storage buffer, static random access memory (SRAM), dynamic random access memory (DRAM), or other storage space. In some implementations, a trace control system may be used to associate a vector instruction obtained from a scalar core with a bit set by a checkpoint for a particular clock cycle in order to correlate the vector instruction with a particular clock cycle (also referred to as "de-queueing"). In some implementations, bits obtained from checkpoints may be compressed to further reduce routing and/or storage of data. Such an implementation may operate to provide an accurate determination of the timing of vector instructions moving through a vector unit implemented in silicon utilizing a compact amount of data for the measurements being taken.

In some implementations, one or more additional checkpoints may be configured to capture bits associated with multiple operations of an individual vector instruction (e.g., micro-operations associated with one vector instruction). For example, one or more additional checkpoints may be configured to capture bits associated with loads and/or stores associated with one or more data elements on which a vector instruction operates. In other words, bits may be captured to give greater visibility into the execution of one vector instruction over multiple clock cycles. In some implementations, one or more additional checkpoints may be configured to capture bits associated with memory accesses of vector instructions from a memory system, such as a private level 2 (L2) cache or a shared level 3 (L3) cache. For example, one or more additional checkpoints may be configured to capture bits that indicate a cache miss associated with a vector instruction.

Figure 1:
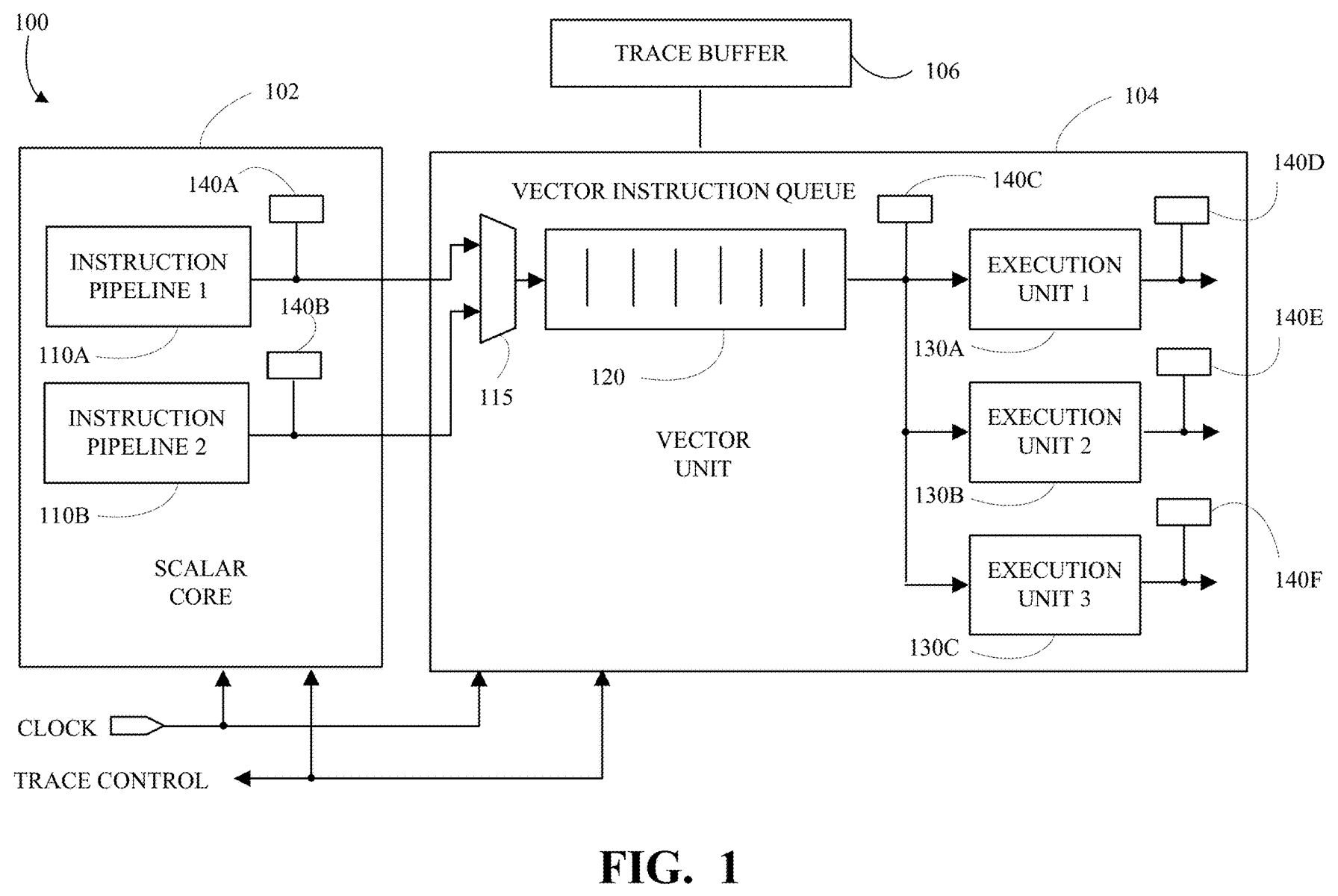

FIG. 1 is a block diagram of an example of a system 100 for cycle accurate tracing of vector instructions. The system 100 includes a scalar core 102, a vector unit 104, and a cycle accurate trace buffer 106. The scalar core 102 and the vector unit 104 may be implemented together in silicon, such as in an application specific integrated circuit (ASIC), a system-on-chip (SoC), or field-programmable gate array (FPGA). Additionally, the scalar core 102 and the vector unit 104 may communicate with one another synchronously via a clock generating clock cycles. The cycle accurate trace buffer 106 may be implemented in silicon by itself or with the scalar core 102 and the vector unit 104, such in the ASIC, the SoC, or the FPGA. The cycle accurate trace buffer 106 may comprise data storage, such as a local storage buffer, SRAM, DRAM, or other storage space.

The scalar core 102 includes, among other things, one or more instruction pipelines for executing instructions in an instruction stream, such as instruction pipelines 110A and 110B. The instruction pipelines may fetch, decode, execute, and retire scalar instructions (which operate on one data element at a time) over multiple clock cycles. Additionally, the instruction pipelines may operate in parallel with respect to one another. For example, instruction pipeline 110A may fetch, decode, execute, and retire scalar instructions while instruction pipeline 110B also fetches, decodes, executes, and retires scalar instructions. Additionally, the instruction pipelines may fetch and dispatch vector instructions (which operate on multiple data elements at the same time) to the vector unit 104 for execution by the vector unit 104. For example, instruction pipeline 110A may fetch and dispatch vector instructions to the vector unit 104 while instruction pipeline 110B also fetches and dispatches vector instructions to the vector unit 104. Further, a combination of scalar and vector instructions may also move through the instruction pipelines 110A and 110B in parallel over multiple clock cycles. For example, instruction pipeline 110A may fetch, decode, execute, and retire scalar instructions while instruction pipeline 110B fetches and dispatches vector instructions to the vector unit 104.

The vector unit 104 may include, among other things, a vector instruction queue 120, and one or more vector instruction execution units (also referred to as "vector execution units" or "sequencers"), such as vector execution units 130A through 130C. The instruction serializer 115 may take vector instructions arriving in parallel from the scalar core 102, on the same clock cycle, and serialize the vector instructions for entry into the vector instruction queue 120 one at a time. The vector instruction queue 120 may receive and queue the vector instructions one at a time. The vector instruction queue 120 may implement a first in, first out (FIFO) instruction storage architecture in which a first vector instruction queued is also a first vector instruction to be dispatched from the queue.

The vector instruction queue 120 dispatches vector instructions to specific vector execution units. For example, the vector instruction queue 120 may dispatch vector instructions to specific vector execution units depending on the opcode of the instruction. The "opcode" may refer to a portion of the instruction that specifies the operation to be performed. Each vector execution unit may be implemented by the vector unit 104 for a predetermined purpose, such as arithmetic, load, and store units implemented for arithmetic, load, and store operations with vector instructions, respectively. For example, vector execution unit 130A may be an arithmetic unit, vector execution unit 130B may be a load unit, and vector execution unit 130C may be a store unit. Additionally, while the vector instruction queue 120 may receive vector instructions in parallel, the vector instruction queue 120 dispatches vector instructions serially to the vector execution units. For example, the vector instruction queue 120 may dispatch a first vector instruction to vector execution unit 130A, followed by a second vector instruction to vector execution unit 130B, followed by a third vector instruction to vector execution unit 130C. The vector execution units, in turn, execute the vector instructions and retire them from the vector unit 104.

For cycle accurate tracing of vector instructions in which the precise timing of instructions moving through the vector unit 104 may be determined, a group of checkpoints may be implemented in the scalar core 102 and/or the vector unit 104 implemented in silicon, such as checkpoints 140A through 140F. The checkpoints may include circuitry including latches or flip-flops implemented in certain points of the scalar core 102 and/or the vector unit 104. Arrival of an instruction at a checkpoint during a clock cycle may cause a signal to trigger the checkpoint to set a bit (e.g., "1") indicating the arrival of the instruction. The bit may be cleared (e.g., "0") on a next clock cycle (and subsequent clock cycles) unless another instruction arrives to set the bit again. By way of example, the checkpoints may include: checkpoint 140A including circuitry that sets a bit for a clock cycle in which an instruction dispatches from an instruction pipeline of the scalar core 102, such as from instruction pipeline 110A (e.g., which may include a vector instruction dispatching from the instruction pipeline 110A to the vector unit 104); checkpoint 140B including circuitry that sets a bit for a clock cycle in which an instruction dispatches from another instruction pipeline of the scalar core 102, such as from instruction pipeline 110B (e.g., which may include a vector instruction dispatching from the instruction pipeline 110B to the vector unit 104); checkpoint 140C including circuitry that sets a bit for a clock cycle in which a vector instruction exits the vector instruction queue 120; checkpoint 140D including circuitry that sets a bit for a clock cycle in which a vector instruction exits a vector execution unit, such as vector execution unit 130A; checkpoint 140E including circuitry that sets a bit for a clock cycle in which a vector instruction exits another vector execution unit, such as vector execution unit 130B; and checkpoint 140F including circuitry that sets a bit for a clock cycle in which a vector instruction exits another vector execution unit, such as vector execution unit 130C.

Accordingly, some checkpoints may be implemented in the scalar core 102 while other checkpoints may be implemented in the vector unit 104. For example, checkpoints 140A and 140B may be implemented in the scalar core 102 while checkpoints 140C through 140F may be implemented in the vector unit 104. Additionally, checkpoints may be implemented differently depending on the implementation—for example, in some implementations, checkpoints 140A and 140B may be implemented in the vector unit 104 or may be combined into a single checkpoint.

In operation, the presence of an instruction at a checkpoint may cause the checkpoint to set a bit during a clock cycle. For example, checkpoint 140A may set a bit for a first clock cycle if a first instruction is present at the checkpoint 140A, checkpoint 140B may set a bit for a second clock cycle if a second instruction is present at the checkpoint 140B, checkpoint 140C may set a bit for a third clock cycle if a third instruction is present at the checkpoint 140C, checkpoint 140D may set a bit for a fourth clock cycle if a fourth instruction is present at the checkpoint 140D, checkpoint 140E may set a bit for a fifth clock cycle if a fifth instruction is present at the checkpoint 140E, and checkpoint 140F may set a bit for a sixth clock cycle if a sixth instruction is present at the checkpoint 140F. Additionally, instructions may set bits at checkpoints during multiple clock cycles. For example, checkpoint 140A may set a bit for a first clock cycle if a first instruction is present at the checkpoint 140A, checkpoint 140C may set a bit for a second clock cycle if the first instruction is present at the checkpoint 140C, and checkpoint 140D may set a bit for a third clock cycle if the first instruction is present at the checkpoint 140D. In some implementations, checkpoints 140A and 140B, when implemented in the scalar core 102, may set a bit when either a scalar instruction or a vector instruction is present at the checkpoint. In some implementations, checkpoints 140C through 140F, when implemented in the vector unit 104, may set a bit when a vector instruction is present at the checkpoint. In some implementations, the checkpoints are configured to set a bit for instructions relating to one or more vector instructions. For example, instructions relating to one or more vector instructions may include branches or jumps following or preceding certain vector instructions.

The system 100 may store the captured bits at an address in the cycle accurate trace buffer 106 with the bits stored in predetermined positions for later decoding, such as bits in positions corresponding to an order of the checkpoints and an order of the clock cycles. For example, the system 100 may capture six bits, corresponding to checkpoints 140A through 140F, for five clock cycles, totaling 30 captured bits (six bits*five clock cycles). The system 100 may store the 30 captured bits, along with 2 bits for framing (e.g., sync bits), as a 32-bit word at an address in the cycle accurate trace buffer 106. The captured bits may be stored in predetermined positions in the 32-bit word for later decoding and associating with vector instructions, such as a bit in a position corresponding to one of the checkpoints 140A through 140F and one of the five clock cycles. Continuing with this example, the system 100 may further capture another six bits, again corresponding to checkpoints 140A through 140F, for another five clock cycles, totaling another 30 captured bits (six bits*five clock cycles). The system 100 may store these 30 captured bits, along with 2 bits for framing (e.g., sync bits), as a next 32-bit word at a next address in the cycle accurate trace buffer 106. The captured bits may again be stored in predetermined positions in the 32-bit word, and in an order of the address in the cycle accurate trace buffer 106, for later decoding and associating with vector instructions. In this way, a trace control system may execute to decode the bits in the cycle accurate trace buffer 106 to associate the bits with vector instructions moving through the vector unit 104 for cycle accurate tracing of vector instructions. For example, the trace control system may be used with a trace encoder to trace the vector instructions from the scalar core and correlate the instructions with the bits. The number of bits captured per clock cycle and the format in which bits are stored may vary, for example, depending on the number of units for which there are associated checkpoints and the number of checkpoints (e.g., with respect to implementations where checkpoints may be consolidated).

In some implementations, the bits stored in the cycle accurate trace buffer 106 may be compressed to reduce bandwidth for routing the bits to the trace buffer and/or to reduce storage in the trace buffer. For example, a compression algorithm may be applied to compress multiple 32-bit words (each including six bits, corresponding to checkpoints 140A through 140F, captured for five clock cycles) into a single 32-bit word stored in the cycle accurate trace buffer 106. For example, a run-length or differential coding compression algorithm could be utilized to reduce the storage space needed for the captured bits. The compressed 32-bit word may be decompressed to restore the positions of bits for correlating to vector instructions.

In some implementations, one or more additional checkpoints may be configured to capture bits associated with multiple operations of an individual vector instruction (e.g., micro-operations associated with one vector instruction). For example, one or more additional checkpoints may be configured to capture bits associated with loads and/or stores associated with one or more data elements on which a vector instruction operates. In other words, bits may be captured to give greater visibility into the execution of one vector instruction over multiple clock cycles. For example, one or more additional checkpoints may be implemented at points within the execution units (e.g., execution units 130A through 130C). In some implementations, one or more additional checkpoints may be configured to capture bits associated with memory accesses of vector instructions from a memory system, such as a private L2 cache or a shared L3 cache, such as at points between the execution units (e.g., execution units 130A through 130C) and a memory system. For example, one or more additional checkpoints may be configured to capture bits that indicate a cache miss associated with a vector instruction.

FIG. 2 is a block diagram of another example of a system 200 for cycle accurate tracing of vector instructions. The system 200 includes a scalar core 202 and a cycle accurate trace buffer 206 like the scalar core 102 and the cycle accurate trace buffer 106 shown in FIG. 1, respectively. The system 200 also includes a vector unit 204 like the vector unit 104 shown in FIG. 1, with a hardware optimization to further reduce bandwidth and/or storage for cycle accurate tracing. A single checkpoint may be used to set a bit when a vector instruction exits one of multiple vector execution units. For example, a single checkpoint 240E may be used to set a bit for a clock cycle in which a vector instruction exits any one of multiple vector execution units, such as vector execution units 230B or 230C. This may be achieved when a vector instruction may retire from one of the multiple vector execution units at a time. For example, vector execution unit 230B may be a load unit, and vector execution unit 230C may be a store unit. It is possible the architecture of the vector unit 204 may prevent a vector instruction from retiring from the load unit in parallel with a vector instruction retiring from the store unit. In this case, a single checkpoint may be used to set a bit for a clock cycle in which a vector instruction retires from either the load unit or the store unit. This may allow fewer bits to be captured per clock cycle, thereby reducing bandwidth and/or storage.

Figure 3:
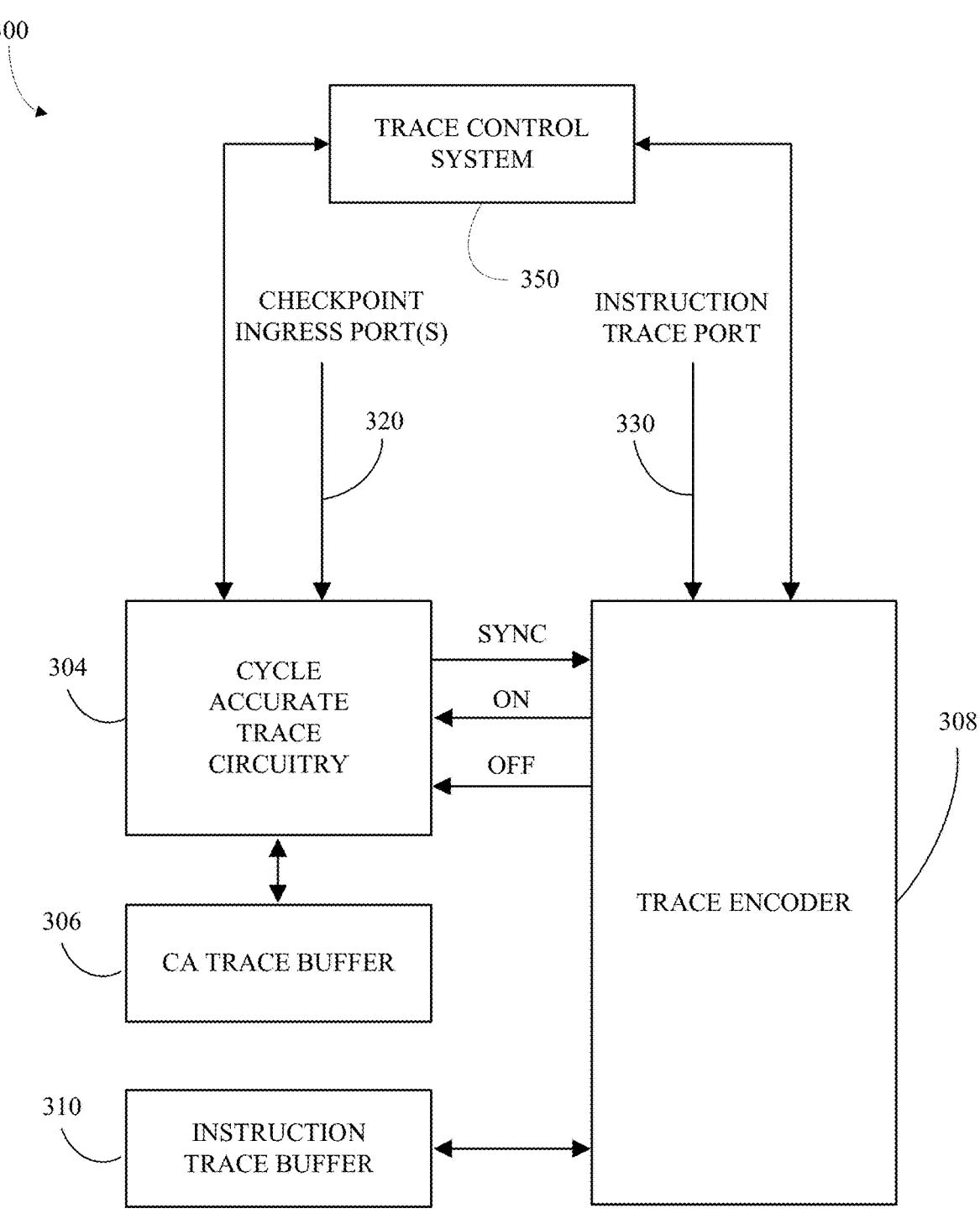
FIG. 3 is a block diagram of an example of a system for synchronizing vector instructions with cycle accurate trace circuitry.

FIG. 3 is a block diagram of an example of a system 300 for synchronizing vector instructions with cycle accurate trace circuitry. The system 300 includes cycle accurate trace circuitry 304, a cycle accurate trace buffer 306, a trace encoder 308, an instruction trace buffer 310, and a trace control system 350. A scalar core, like the scalar core 102 shown in FIG. 1 or the scalar core 202 shown in FIG. 2, may dispatch instructions in a stream, including vector instructions (e.g., to a vector unit, like the vector unit 104 shown in FIG. 1 or the vector unit 204 shown in FIG. 2). For example, the scalar core may dispatch instructions one at a time or two at a time (in parallel) from one or more instruction pipelines of the scalar core, including vector instructions dispatching to the vector unit.

The cycle accurate trace circuitry 304 may receive signals from checkpoints in the scalar core and/or the vector unit via checkpoint ingress port(s) 320. For example, the cycle accurate trace circuitry 304 may receive signals from checkpoints such as checkpoints 140A through 140F shown in FIG. 1 or checkpoints 240A through 240F shown in FIG. 2. The cycle accurate trace circuitry 304 may also implement circuitry for capturing a program counter associated with the vector instructions (e.g., sync bits), circuitry for communicating with the trace control system 350 (e.g., a trace control interface), circuitry for communicating with the trace encoder 308 (e.g., a "SYNC" signal, an "ON" signal, and an "OFF"), and/or circuitry for moving captured bits (e.g., arriving via the checkpoint ingress port(s) 320) to the cycle accurate trace buffer 306 (e.g., a 32-bit shift register). The cycle accurate trace circuitry 304 may start and stop the capture of bits associated with the arrival of instructions at the checkpoints and may store the captured bits in the cycle accurate trace buffer 306 (e.g., a cycle accurate trace). The cycle accurate trace buffer 306 may comprise data storage like the cycle accurate trace buffer 106 shown in FIG. 1 or the cycle accurate trace buffer 206 shown in FIG. 2.

The trace encoder 308 may monitor instructions dispatched by the scalar core, including vector instructions, via an instruction trace port 330. In some implementations, instruction trace port 330 may be specific to the vector unit and may provide for the monitoring of only vector instructions or instructions related thereto. The trace encoder 308 may be implemented in hardware, software, or a combination thereof. For example, in some implementations, the trace encoder 308 may include circuitry for communicating with the trace control system 350 and circuitry for communicating with the cycle accurate trace circuitry 304 (e.g., the "SYNC" signal, the "ON" signal, and the "OFF"), such as for syncing with the cycle accurate trace circuitry 304 and starting and stopping the capture of bits. The trace encoder 308 may trace instructions in the stream, including vector instructions, and store the instructions in the instruction trace buffer 310 (e.g., an instruction trace). For example, the trace encoder 308 may store addresses, opcodes, and/or arguments associated with instructions in the stream, decode specific types of the instructions (e.g., branches and jumps), and compress the instructions for storage in the instruction trace buffer 310 based on the decoding. In some implementations, the trace encoder 308 may store sync points for correlating vector instructions with captured bits in the cycle accurate trace buffer 306.

The trace control system 350 may access the cycle accurate trace stored in the cycle accurate trace buffer 306 and the instruction trace stored in the instruction trace buffer 310. The trace control system 350 may execute software (e.g., trace de-queueing software) to associate specific vector instructions in the instruction trace with cycle accurate tracing captured by the cycle accurate trace circuitry 304. For example, the trace encoder 308 may monitor instructions in the stream, such as with respect to addresses, opcodes, and/or arguments, via the instruction trace port 330, and the cycle accurate trace circuitry 304 may capture cycle accurate bits via the checkpoint ingress port(s) 320. The trace control system 350 may then associate vector instructions monitored by the trace encoder 308 (e.g., in the stream) with bits captured by the cycle accurate trace circuitry 304. For example, the trace encoder 308 and/or the trace control system 350 may be implemented on the system 400 of FIG. 4.

For example, the trace encoder 308 may monitor vector instructions in a stream (e.g., with respect to the RISC-V vector instruction set, "vle32.v" and "vfmacc.vf" instructions arriving in parallel) and the cycle accurate trace circuitry 304 may capture cycle accurate bits associated with the stream. The trace control system 350 may associate a first vector instruction (e.g., "vle32.v") with a first bit set by a first checkpoint (e.g., checkpoint 140A shown in FIG. 1) during a first clock cycle and associate a second vector instruction (e.g., "vfmacc.vf") with second a bit set by a second checkpoint (e.g., checkpoint 140B shown in FIG. 1) also during the first clock cycle (e.g., arriving in parallel). Additionally, the trace control system 350 may further associate the first vector instruction (e.g., "vle32.v") with a third bit set by a third checkpoint (e.g., checkpoint 140C shown in FIG. 1) during a second clock cycle, and to a fourth bit set by a fourth checkpoint (e.g., checkpoint 140D shown in FIG. 1) during a third clock cycle. Similarly, the trace control system 350 may further associate the second vector instruction (e.g., "vfmacc.vf") with a third bit set by the third checkpoint (e.g., checkpoint 140C shown in FIG. 1) during a fourth clock cycle, and to a fourth bit set by a fourth checkpoint (e.g., checkpoint 140E shown in FIG. 1) during a fifth clock cycle. In this way, the trace control system 350 may correlate the timing of vector instructions through the vector unit with specific vector instructions. While the foregoing description refers to RISC-V vector instructions as an example, implementations of this disclosure may also be utilized with vector instructions based on different vector instruction sets.

Additionally, the trace control system 350 may produce associations between vector instructions in the stream and bits captured by the cycle accurate trace circuitry 304 in order to associate vector instructions with checkpoints and clock cycles in the trace. The associations may be utilized by post-acquisition display software to permit a user to see the cycle accurate timing of a vector instruction as it is dispatched from the scalar core, queued, and executed in the vector unit as traces of vector instructions. For example, the foregoing software may be executed on a computer system such as the system 400 of FIG. 4.

In some implementations, to permit associations between a vector instruction in the instruction stream with a bit captured by the cycle accurate trace circuitry 304, the trace encoder 308 and the cycle accurate trace circuitry 304 may synchronize with one another so that the trace encoder 308 and the cycle accurate trace circuitry 304 start and stop in concert. In some implementations, the trace encoder 308 and/or the cycle accurate trace circuitry 304 may be controlled by the trace control system 350 through a trace control interface configured as a TileLink slave node appearing in physical memory, including as described in the SiFive TileLink Specification, Version 1.8.1, Jan. 27, 2020. In some implementations, the trace control interface may be configured for use with a JTAG (Joint Test Action Group) probe. To begin collecting a trace, the trace control system 350 may command the cycle accurate trace circuitry 304 to start a capture period, such as by writing to a memory-mapped register instructing the cycle accurate trace circuitry 304 to begin. In response, the cycle accurate trace circuitry 304 may capture sync bits (e.g., serialized as two bits, which may be used for framing a 32-bit word). The sync bits may be associated with an address of a program counter that points to a vector instruction. The cycle accurate trace circuitry 304 may insert the sync bits in the cycle accurate trace stream (e.g., captured in the cycle accurate trace buffer 306). The cycle accurate trace circuitry 304 may also send a "SYNC" message to the trace encoder 308 indicating the sync point. The trace encoder 308 may receive the SYNC message a number of clock cycles later (e.g., skew). Upon receipt of the SYNC message, the trace encoder 308 may capture an address of a program counter that points to an instruction in the instruction trace. The trace encoder 308 may insert the sync point (e.g., the address of the program counter) in the instruction trace stream (e.g., captured in the instruction trace buffer 310). The sync bits in the cycle accurate trace stream and the sync point in the instruction trace stream may permit the trace control system 350 to correlate bits captured by the cycle accurate trace circuitry 304 with vector instructions traced by the trace encoder 308. The control system 350 may adjust for the number of clock cycles between the sync bits in the cycle accurate trace stream and the sync point in the instruction trace stream (e.g., the skew) when determining the correlation. In some implementations, the trace encoder 308 may send the "ON" signal and the "OFF" signal to the cycle accurate trace circuitry 304 to control the range for capturing bits in the cycle accurate trace buffer 306 (e.g., to limit the capture period). This may permit saving storage space in the cycle accurate trace buffer 306. In some implementations, the "ON" signal and the "OFF" signal may be generated by watchpoints comprising address comparators configured to match executed instruction addresses and/or data read and/or write addresses. Data stored in the cycle accurate trace buffer 306 and in the instruction trace buffer 310 may be accessed by the trace control system 350. For example, the trace control system 350 may access the data to determine associations between vector instructions in the instruction stream and bits captured by the cycle accurate trace circuitry 304. These associations may be used to determine the clock cycles at which a particular vector instruction is present at a particular checkpoint. Further, the trace control system 350 may execute post-acquisition display software to permit a user to see the cycle accurate timing of a vector instruction as it is dispatched from the scalar core, queued, and executed in the vector unit.

In some implementations, to associate specific vector instructions in the instruction stream with bits captured by the cycle accurate trace circuitry 304, the vector instruction queue (such as the vector instruction queue 120 of FIG. 1) may be flushed. For example, a predetermined "fence" instruction (e.g., a type of barrier instruction that causes a processor to enforce an ordering constraint on memory operations issued before and after the barrier instruction) may dispatch from the scalar core to the vector unit to flush the vector instruction queue. The trace encoder 308 and/or the control system 350 may recognize the fence instruction in the stream and use the fence instruction as an event which triggers synchronization to begin with the next vector instruction in the stream.

In some implementations, to associate specific vector instructions in the instruction stream with bits captured by the cycle accurate trace circuitry 304, the trace encoder 308 and/or the trace control system 350 may wait for the vector instruction queue to empty. For example, the trace encoder 308 and/or the trace control system 350 may receive an indication from the cycle accurate trace circuitry 304 that the vector instruction queue is empty via a trace control interface. For example, the indication may be generated by checkpoints not setting bits (which indicate arrival of vector instructions) for a number of clock cycles corresponding to a depth of the vector instruction queue. Accordingly, the trace encoder 308 and/or the trace control system 350 may receive an indication from the cycle accurate trace circuitry 304 that the vector instruction queue is empty and may use the indication as an event which triggers synchronization to begin with the next vector instruction.

In some implementations, to associate specific vector instructions in the instruction stream with bits captured by the cycle accurate trace circuitry 304, the trace encoder 308 and/or the trace control system 350 may permit a user to manually adjust alignment of the start signal ("ON") to vector instructions in the stream. The trace encoder 308 and/or the trace control system 350 may also permit a user to manually adjust alignment of the stop signal ("OFF") to vector instructions in the stream. This adjustment may provide flexibility and control to a user to employ knowledge about the code being executed. Accordingly, vector instructions moving through a vector unit implemented in silicon may be correlated with precise timing.

Figure 4:
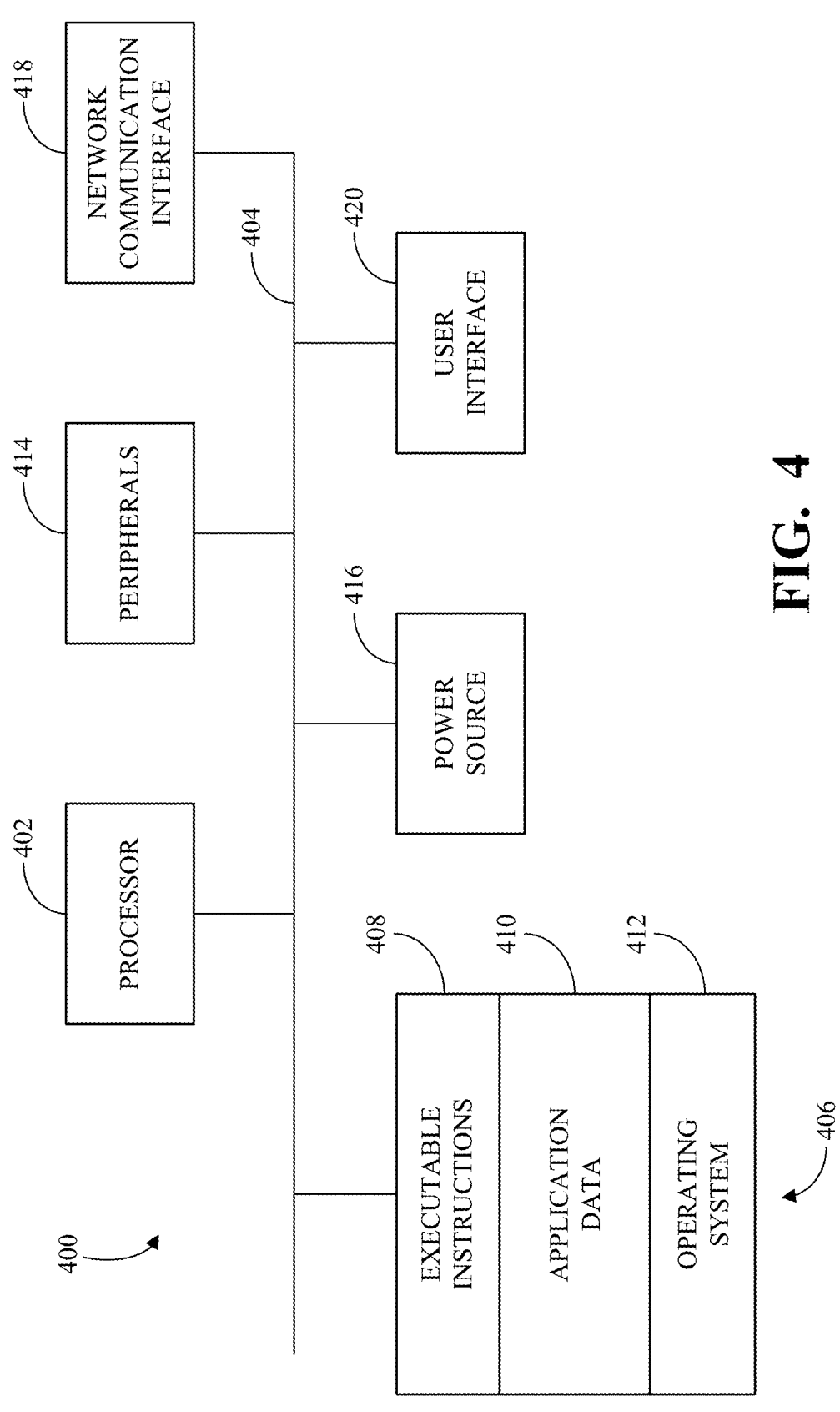
FIG. 4 is block diagram of an example of a system for facilitating tracing of vector instructions and/or generation of a circuit representation.

FIG. 4 is block diagram of an example of a system 400 facilitating cycle accurate tracing of vector instructions. The system 400 is an example of an internal configuration of a computing device that may be used to implement the trace encoder 308 and/or the trace control system 350 shown in FIG. 3. The system 400 can include components or units, such as a processor 402, a bus 404, a memory 406, peripherals 414, a power source 416, a network communication interface 418, a user interface 420, other suitable components, or a combination thereof.

The processor 402 can be a central processing unit (CPU), such as a microprocessor, and can include single or multiple processors having single or multiple processing cores. Alternatively, the processor 402 can include another type of device, or multiple devices, now existing or hereafter developed, capable of manipulating or processing information. For example, the processor 402 can include multiple processors interconnected in any manner, including hardwired or networked, including wirelessly networked. In some implementations, the operations of the processor 402 can be distributed across multiple physical devices or units that can be coupled directly or across a local area or other suitable type of network. In some implementations, the processor 402 can include a cache, or cache memory, for local storage of operating data or instructions. The system 400 can include components or units, such as a processor 402, a bus 404, a memory 406, peripherals 414, a power source 416, a network communication interface 418, a user interface 420, other suitable components, or a combination thereof.

The memory 406 can include volatile memory, non-volatile memory, or a combination thereof. For example, the memory 406 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 406 can include another type of device, or multiple devices, now existing or hereafter developed, capable of storing data or instructions for processing by the processor 402. The processor 402 can access or manipulate data in the memory 406 via the bus 404. Although shown as a single block in FIG. 4, the memory 406 can be implemented as multiple units. For example, a system 400 can include volatile memory, such as RAM, and persistent memory, such as a hard drive or other storage.

The memory 406 can include executable instructions 408, data, such as application data 410, an operating system 412, or a combination thereof, for immediate access by the processor 402. The executable instructions 408 can include, for example, one or more application programs, which can be loaded or copied, in whole or in part, from non-volatile memory to volatile memory to be executed by the processor 402. The executable instructions 408 can be organized into programmable modules or algorithms, functional programs, codes, code segments, or combinations thereof to perform various functions described herein. For example, the executable instructions 408 can include instructions executable by the processor 402 to cause the system 400 to execute the trace de-queueing software and/or the post-acquisition display software of the trace control system 350 shown in FIG. 3. The application data 410 can include, for example, user files, database catalogs or dictionaries, configuration information or functional programs, such as a web browser, a web server, a database server, or a combination thereof. The operating system 412 can be, for example, Microsoft Windows®, macOS®, or Linux®; an operating system for a small device, such as a smartphone or tablet device; or an operating system for a large device, such as a mainframe computer. The memory 406 can comprise one or more devices and can utilize one or more types of storage, such as solid state or magnetic storage.

The peripherals 414 can be coupled to the processor 402 via the bus 404. The peripherals 414 can be sensors or detectors, or devices containing any number of sensors or detectors, which can monitor the system 400 itself or the environment around the system 400. For example, a system 400 can contain a temperature sensor for measuring temperatures of components of the system 400, such as the processor 402. Other sensors or detectors can be used with the system 400, as can be contemplated. In some implementations, the power source 416 can be a battery, and the system 400 can operate independently of an external power distribution system. Any of the components of the system 400, such as the peripherals 414 or the power source 416, can communicate with the processor 402 via the bus 404.

The network communication interface 418 can also be coupled to the processor 402 via the bus 404. In some implementations, the network communication interface 418 can comprise one or more transceivers. The network communication interface 418 can, for example, provide a connection or link to a network, via a network interface, which can be a wired network interface, such as Ethernet, or a wireless network interface. For example, the system 400 can communicate with other devices via the network communication interface 418 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 420 can include a display; a positional input device, such as a mouse, touchpad, touchscreen, or the like; a keyboard; or other suitable human or machine interface devices. The user interface 420 can be coupled to the processor 402 via the bus 404. Other interface devices that permit a user to program or otherwise use the system 400 can be provided in addition to or as an alternative to a display. In some implementations, the user interface 420 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 414. The operations of the processor 402 can be distributed across multiple clients or servers, which can be coupled directly or across a local area or other suitable type of network. The memory 406 can be distributed across multiple clients or servers, such as network-based memory or memory in multiple clients or servers performing the operations of clients or servers. Although depicted here as a single bus, the bus 404 can be composed of multiple buses, which can be connected to one another through various bridges, controllers, or adapters.

Figure 5:
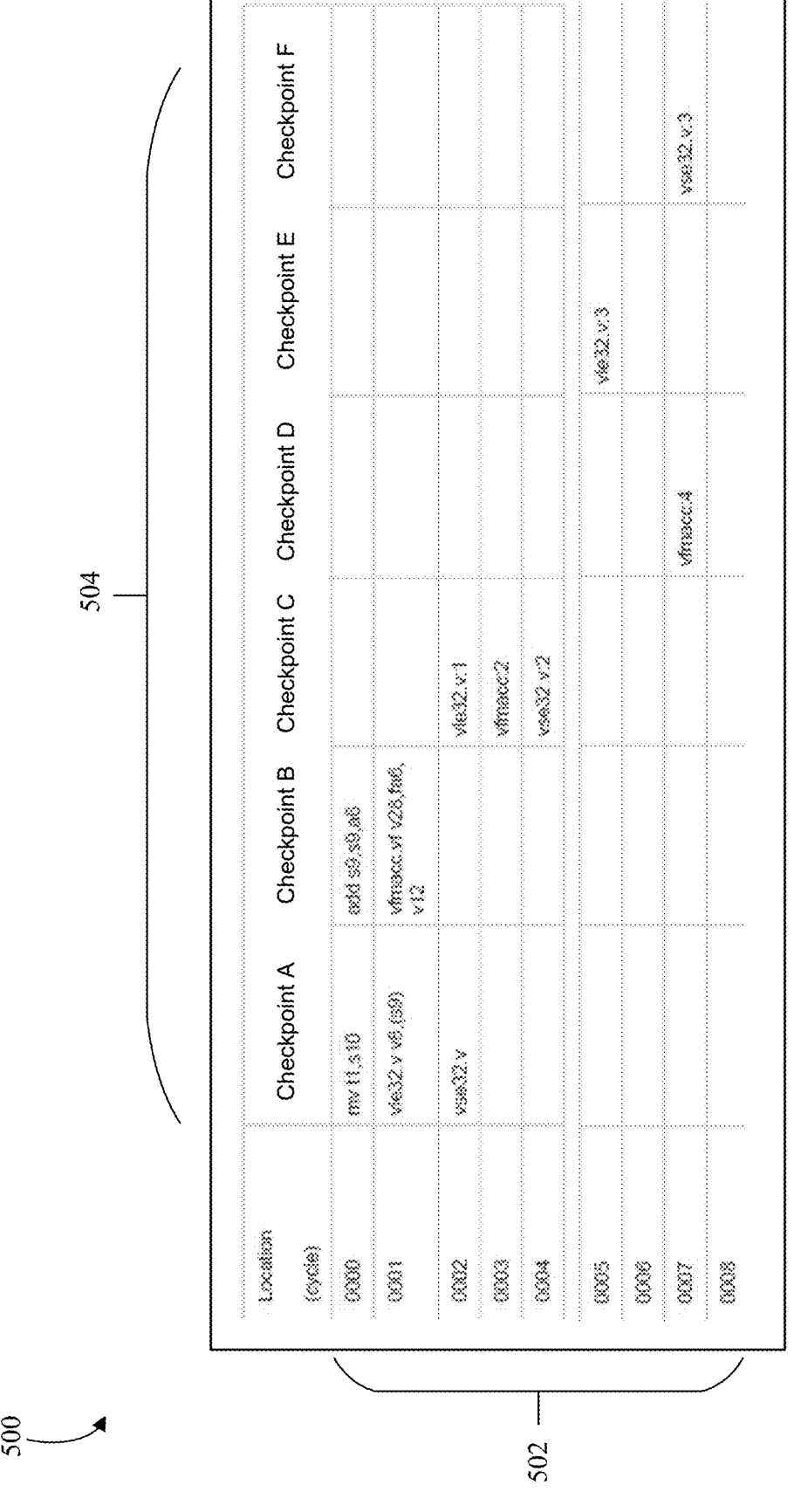
FIG. 5 is an example of a list view associated with cycle accurate tracing of vector instructions.

FIG. 5 is an example of a list view 500 associated with cycle accurate tracing of vector instructions. For example, the list view 500 may be prepared by post-acquisition display software executed by a trace control system, such as the trace control system 350 shown of FIG. 3. The list view 500 may be output to a display, such as to the user interface 420 of FIG. 4. The list view 500 illustrates vector instruction traces indicating cycle accurate timing of vector instructions moving between checkpoints of the processor. The timing is based on the associations between vector instructions monitored in a stream and bits captured by cycle accurate trace circuitry, such as the cycle accurate trace circuitry 304 shown in FIG. 3. Accordingly, the list view 500 may comprise traces of vector instructions, with cycle accurate timing, displayed in a table format.

The list view 500 includes a number of rows 502 corresponding to clock cycles. The clock cycles may be sequential clock cycles during a capture period, such as clock cycles starting and stopping in synchronization with a trace encoder, such as the trace encoder 308 shown in FIG. 3. The list view 500 also includes a number of columns 504 corresponding to checkpoints. For example, the columns 504 may correspond to checkpoints A through F, which represent checkpoints 140A through 140F shown in FIG. 1, respectively. Each column 504 may show a cascade of instructions in time through its corresponding checkpoint.

An entry with an instruction name indicates a bit being set (e.g., "1") by a checkpoint for a clock cycle, corresponding to arrival of an instruction. Additionally, absence of an entry indicates a bit being clear (e.g., "0") by a checkpoint for a clock cycle if a vector instruction is not present at the checkpoint during that clock cycle.

For example, for tracing the vector instruction "vle32.v," checkpoint A (e.g., checkpoint 140A shown in FIG. 1) indicates arrival of the "vle32.v" instruction in a row corresponding to clock cycle 0001 as determined by a trace encoder (e.g., trace encoder 308 shown in FIG. 3). This indicates the "vle32.v" instruction is dispatched to the vector unit (e.g., vector unit 104 shown in FIG. 1) from the scalar core during clock cycle 0001. Next, checkpoint C (e.g., checkpoint 140C shown in FIG. 1) indicates arrival of the "vle32.v" instruction in a row corresponding to clock cycle 0002, as determined by the trace encoder. This indicates the "vle32.v" instruction exited the vector instruction queue of the vector unit during clock cycle 0002. This also indicates the "vle32.v" instruction moved from the first checkpoint to the second checkpoint in one clock cycle. Next, checkpoint E (e.g., checkpoint 140E shown in FIG. 1) indicates arrival of the "vle32.v" instruction in a row corresponding to clock cycle 0005, as determined by the trace encoder. This indicates the "vle32.v" instruction exited a vector execution unit (e.g., vector execution unit 130B shown in FIG. 1, which may be a load unit) during clock cycle 0005. This also indicates the "vle32.v" instruction moved from the second checkpoint to the third checkpoint in three clock cycles. Using this information, a user may analyze movement of vector instructions in the vector unit. Additionally, the user may identify delays or stalls in the vector unit, such as excessive clock cycles between checkpoints, for improving the integrated circuit design.

In some implementations, the columns 504 may include the clock cycle counts for instructions arriving from previous checkpoints. In some implementations, the columns 504 may also include addresses, opcodes, and/or arguments for the instructions.

Figure 6:
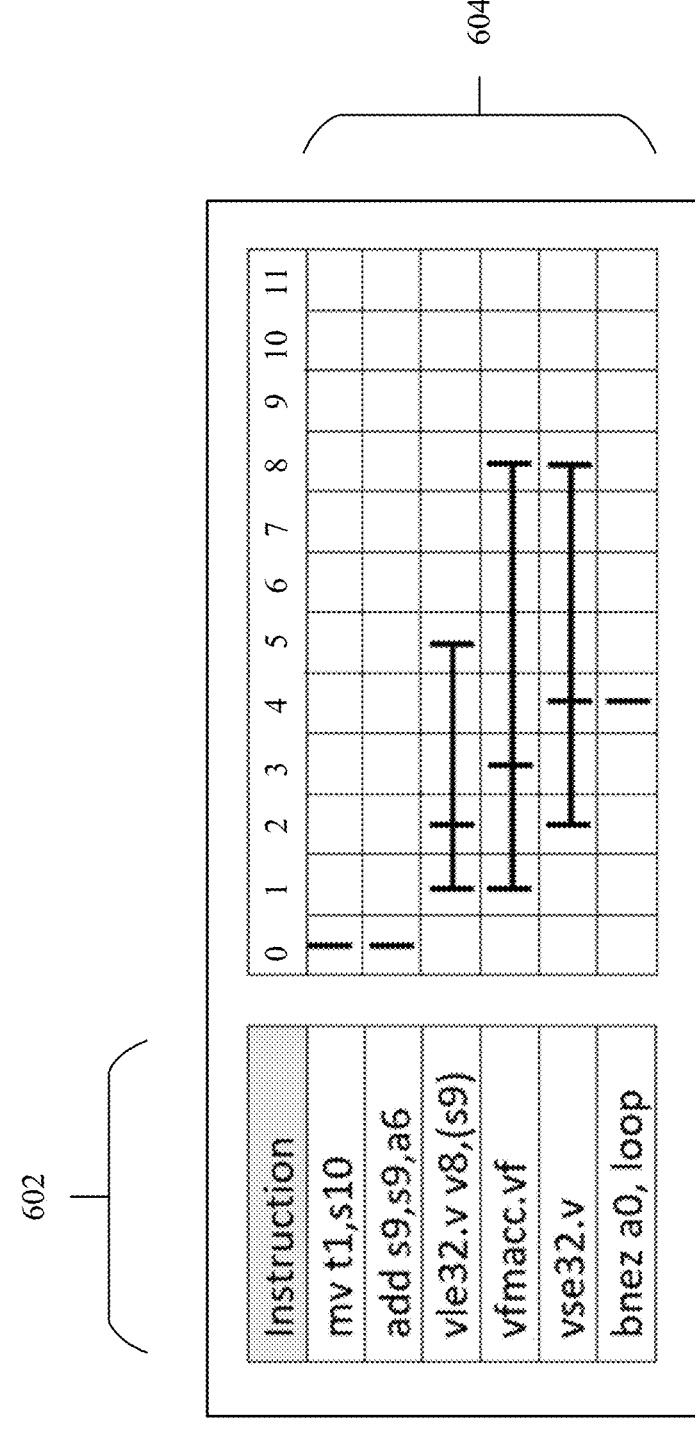
FIG. 6 is an example of a waveform view associated with cycle accurate tracing of vector instructions.

FIG. 6 is an example of a waveform view 600 associated with cycle accurate tracing of vector instructions. For example, the waveform view 600 may be prepared by post-acquisition display software executed by a trace control system, such as the trace control system 350 of FIG. 3. The waveform view 600 may be output to a display, such as to the user interface 420 of FIG. 4. The waveform view 600 illustrates vector instruction traces indicating cycle accurate timing of vector instructions moving between checkpoints of the processor. The timing is based on the associations between vector instructions monitored in a stream and bits captured by cycle accurate trace circuitry, such as the cycle accurate trace circuitry 304 shown in FIG. 3. Accordingly, the waveform view 600 may comprise traces of vector instructions, with cycle accurate timing, displayed in a pipeline timing diagram format.

The waveform view 600 may include a list of instructions 602 corresponding to rows 604 in a grid. Slots in the grid may represent clock cycles. The clock cycles may be sequential clock cycles during a capture period, such as clock cycles starting and stopping in synchronization with a trace encoder, such as the trace encoder 308 shown in FIG. 3. A marker in a slot, such as a vertical bar, may indicate a bit being set (e.g., "1") by a checkpoint for a clock cycle, corresponding to arrival of an instruction. Additionally, absence of the marker in a slot indicates a bit being clear (e.g., "0") by a checkpoint for a clock cycle while the checkpoint awaits arrival of an instruction. A line between vertical bars indicates timing of the instruction through clock cycles. The waveform view 600 may scroll horizontally, e.g., left to right, to view multiple clock cycles for vector instructions.

For example, for tracing the vector instruction "vle32.v," a vertical bar in slot one indicates arrival of the "vle32.v" instruction at a first checkpoint (e.g., checkpoint 140A shown in FIG. 1) as determined by a trace encoder (e.g., trace encoder 308 shown in FIG. 3). This indicates the "vle32.v" instruction dispatched to the vector unit (e.g., vector unit 104 shown in FIG. 1) from the scalar core. Next, a vertical bar in slot two indicates arrival of the "vle32.v" instruction at a second checkpoint (e.g., checkpoint 140C shown in FIG. 1) as determined by the trace encoder. This indicates the "vle32.v" instruction exited the vector instruction queue. This also indicates the "vle32.v" instruction moved from the first checkpoint to the second checkpoint in one clock cycle. Next, a vertical bar in slot five indicates arrival of the "vle32.v" instruction at a third checkpoint (e.g., checkpoint 140D, checkpoint 140E, or checkpoint 140F shown in FIG. 1) as determined by the trace encoder. This indicates the "vle32.v" instruction exited a vector execution unit. This also indicates the "vle32.v" instruction moved from the second checkpoint to the third checkpoint in three clock cycles. In some implementations, the trace encoder may execute to determine the specific checkpoint, such as by analyzing the order, address, opcode, and/or arguments of the instruction. In this way, a user may analyze movement of vector instructions in the vector unit. Additionally, the user may identify delays or stalls in the vector unit, such as excessive clock cycles between checkpoints, for improving the integrated circuit design.

Figure 7:
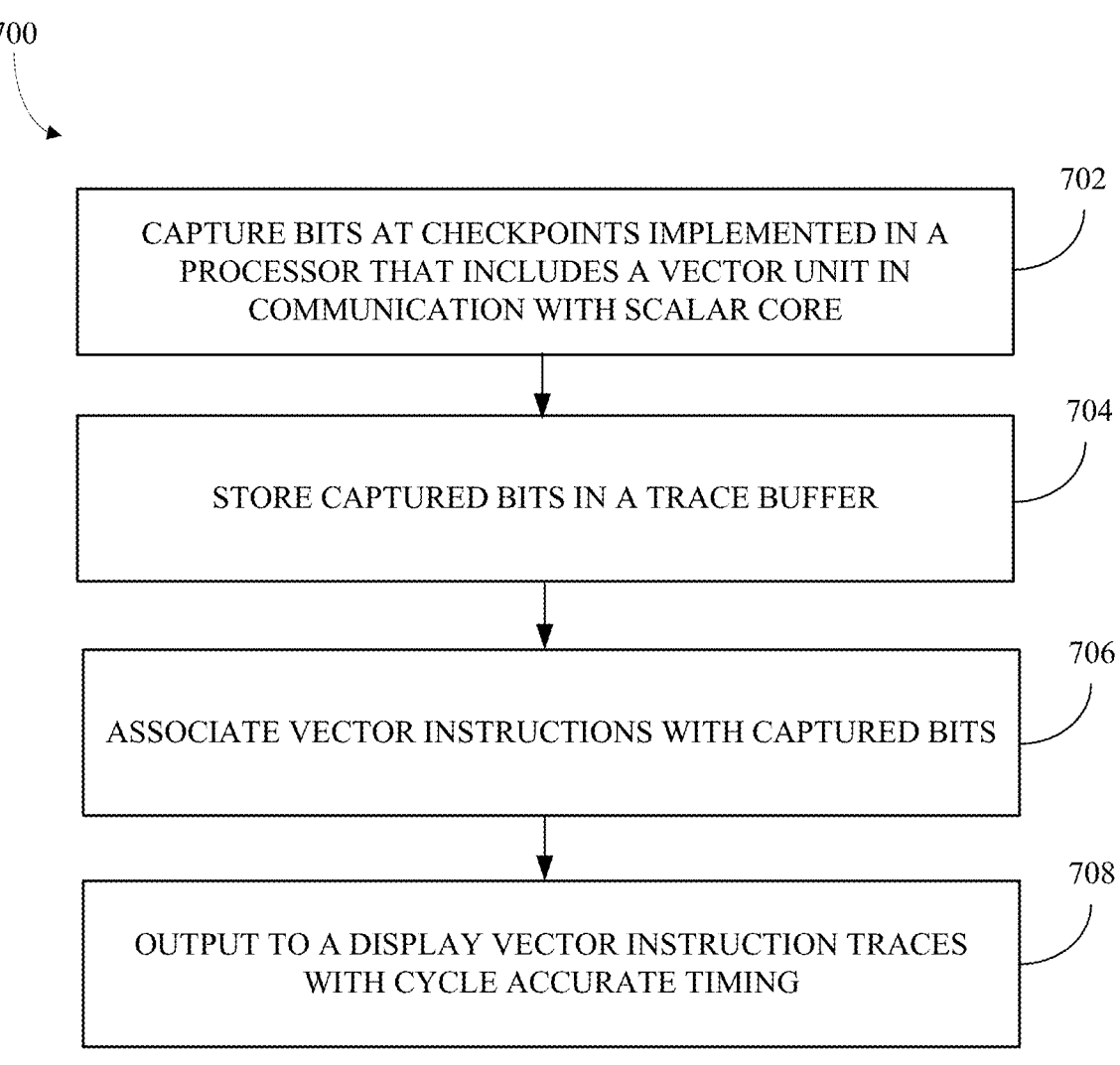
FIG. 7 is a flow chart of an example of a process for associating vector instructions with bits captured by cycle accurate trace circuitry.

FIG. 7 is a flow chart of an example of a process 700 for associating vector instructions with bits captured by cycle accurate trace circuitry. The process 700 includes capturing 702 multiple bits at checkpoints; storing 704 the captured bits in a trace buffer; associating 706 vector instructions with the captured bits; and outputting 708 to a display the associations between the captured bits and the vector instructions. For example, the process 700 may be implemented using the system 100 shown in FIG. 1, the system 200 shown in FIG. 2, and/or the system 300 shown in FIG. 3.

The process 700 includes capturing 702 bits at checkpoints implemented in a scalar core and/or a vector unit implemented in silicon, such as checkpoints 140A through 140F shown in FIG. 1 or checkpoints 240A through 240F shown in FIG. 2. The checkpoints may include a first checkpoint including circuitry that sets a first bit for a clock cycle in which a vector instruction exits a vector instruction queue, and a second checkpoint including circuitry that sets a second bit for a clock cycle in which a vector instruction exits a vector execution unit. The bits may be captured during multiple clock cycles of a capture period. The bits may be captured in synchronization with a trace encoder, such as the trace encoder 308 shown in FIG. 3.

The process 700 also includes storing 704 the captured bits in a trace buffer comprising data storage, such as the cycle accurate trace buffer 106 shown in FIG. 1, the cycle accurate trace buffer 206 shown in FIG. 2, or the cycle accurate trace buffer 306 shown in FIG. 3. The bits may be stored in predetermined positions for later decoding, such as bits in positions corresponding to an order of the checkpoints and an order of the clock cycles. Additionally, the bits may be stored at predetermined addresses in the trace buffer for later decoding, such as storing captured bits in a 32-bit word of bits at a first address, followed by a 32-bit word of bits at a second address, and so forth.

The process 700 also includes associating 706 vector instructions being traced with the captured bits. For example, a trace control system may execute trace de-queueing software to associate specific vector instructions in an instruction stream (e.g., monitored by a trace encoder) with bits being captured by cycle accurate trace circuitry, such as the cycle accurate trace circuitry 304 show in FIG. 3. Multiple vector instructions may be associated with various captured bits. For example, a first vector instruction may be associated with a first bit set by a first checkpoint during a clock cycle; a second vector instruction may be associated with a second bit set by a second checkpoint during a clock cycle; and a third vector instruction may be associated with a third bit set by a third checkpoint during a clock cycle. Additionally, a vector instruction may be associated with captured bits through multiple clock cycles. For example, a vector instruction may be associated with a first bit set by a first checkpoint during a first clock cycle, a second bit set by a second checkpoint during a second clock cycle, and a third bit set by a third checkpoint during a third clock cycle.

The process 700 also includes outputting 708 to a display, such as the user interface 420 of FIG. 4, vector instruction traces indicating cycle accurate timing of vector instructions moving between checkpoints of the processor. The timing is based on the associations between vector instructions monitored in a stream and bits captured by the cycle accurate trace circuitry. In some implementations, the traces of the vector instructions may be displayed in a list view, such as the list view 500 shown in FIG. 5. In some implementations, the traces of the vector instructions may be displayed in a waveform view, such as the waveform view 600 shown in FIG. 6. The traces may indicate numbers of clock cycles between vector instructions arriving at checkpoints. Displaying traces of the vector instructions may permit a user to analyze movement of vector instructions in a vector unit, such as to identify delays or stalls in the vector unit for improving the integrated circuit design.

FIG. 8 is a flow chart of an example of a process 800 for synchronizing cycle accurate trace circuitry with tracing of vector instructions. The process 800 includes starting 802 synchronization between a trace encoder and cycle accurate trace circuitry; capturing 804 bits at checkpoints; storing 806 the captured bits in a trace buffer; determining 808 whether the vector instruction tracing is complete; and stopping 810 synchronization between the trace encoder and the cycle accurate trace circuitry. For example, the process 800 may be implemented using the system 100 shown in FIG. 1, system 200 shown in FIG. 2, and/or the system 300 shown in FIG. 3.

The process 800 includes starting 802 synchronization between a trace encoder and cycle accurate trace circuitry, such as the trace encoder 308 and the cycle accurate trace circuitry 304 shown in in FIG. 3. The trace encoder and the cycle accurate trace circuitry may synchronize with one another so that the trace encoder and the cycle accurate trace circuitry start and stop simultaneously with one another. In some implementations, the trace encoder and the cycle accurate trace circuitry may synchronize with one another and begin vector instruction tracing using a trace control system like the trace control system 350 shown in FIG. 3.

In some implementations, a predetermined fence instruction may be used to effectively flush the vector instruction queue. In some implementations, before starting the trace, the trace encoder may wait for a vector instruction queue of the vector unit to empty. For example, the trace encoder may receive an indication from the cycle accurate trace circuitry that the vector instruction queue is empty via a trace control interface. For example, the indication may be generated by checkpoints not setting bits (indicating arrival of vector instructions) for a number of clock cycles corresponding to a depth of the vector instruction queue. In some implementations, the trace encoder may permit a user to manually adjust the alignment of the start signal ("ON") to vector instructions in the stream to start.

The process 800 also includes capturing 804 bits at checkpoints implemented in a scalar core and/or a vector unit implemented in silicon, such as checkpoints 140A through 140F shown in FIG. 1 or checkpoints 240A through 240F shown in FIG. 2. The checkpoints may include a first checkpoint including circuitry that sets a first bit for a clock cycle in which a vector instruction exits a vector instruction queue, and a second checkpoint including circuitry that sets a second bit for a clock cycle in which a vector instruction exits a vector execution unit. Accordingly, the cycle accurate trace circuitry may capture bits associated with the arrival of specific vector instructions in the stream during the capture period.

The process 800 also includes storing 806 the captured bits in a cycle accurate trace buffer comprising data storage, such as the cycle accurate trace buffer 106 shown in FIG. 1, the cycle accurate trace buffer 206 shown in FIG. 2, or the cycle accurate trace buffer 306 shown in FIG. 3. Further, an instruction trace may be captured by the trace encoder in an instruction trace buffer, such as the instruction trace buffer 310 shown in FIG. 3. The bits in the cycle accurate trace buffer may be stored in predetermined positions for later decoding, such as bits in positions corresponding to an order of the checkpoints and an order of the clock cycles. Additionally, the bits may be stored at predetermined addresses in the trace buffer for later decoding, such as storing captured bits in a 32-bit word of bits at a first address, followed by a 32-bit word of bits at a second address following the first address, and so forth.

The process 800 also includes determining 808 whether the vector instruction tracing is complete. In some implementations, the trace encoder and/or the trace control system may determine whether the vector instruction tracing is complete based on the instructions being monitored in the instruction stream. For example, the trace encoder and/or the trace control system may recognize an instruction in the instruction stream, such as a predetermined fence instruction, as an event which triggers the synchronization to stop. In some implementations, the trace encoder and/or the trace control system may permit a user to manually adjust the alignment of the stop signal ("OFF") to vector instructions in the stream. If vector instruction tracing is not complete ("NO"), the process 800 may return to capturing 804 bits at checkpoints. If vector instruction tracing is complete ("YES"), the process 800 may continue with stopping 810 synchronization between the trace encoder and the cycle accurate trace circuitry and ending the vector instruction tracing. For example, to simultaneously stop tracing (e.g., stop the capture period), the trace encoder may assert a stop signal ("OFF") sent to the cycle accurate trace circuitry.

Figure 9:
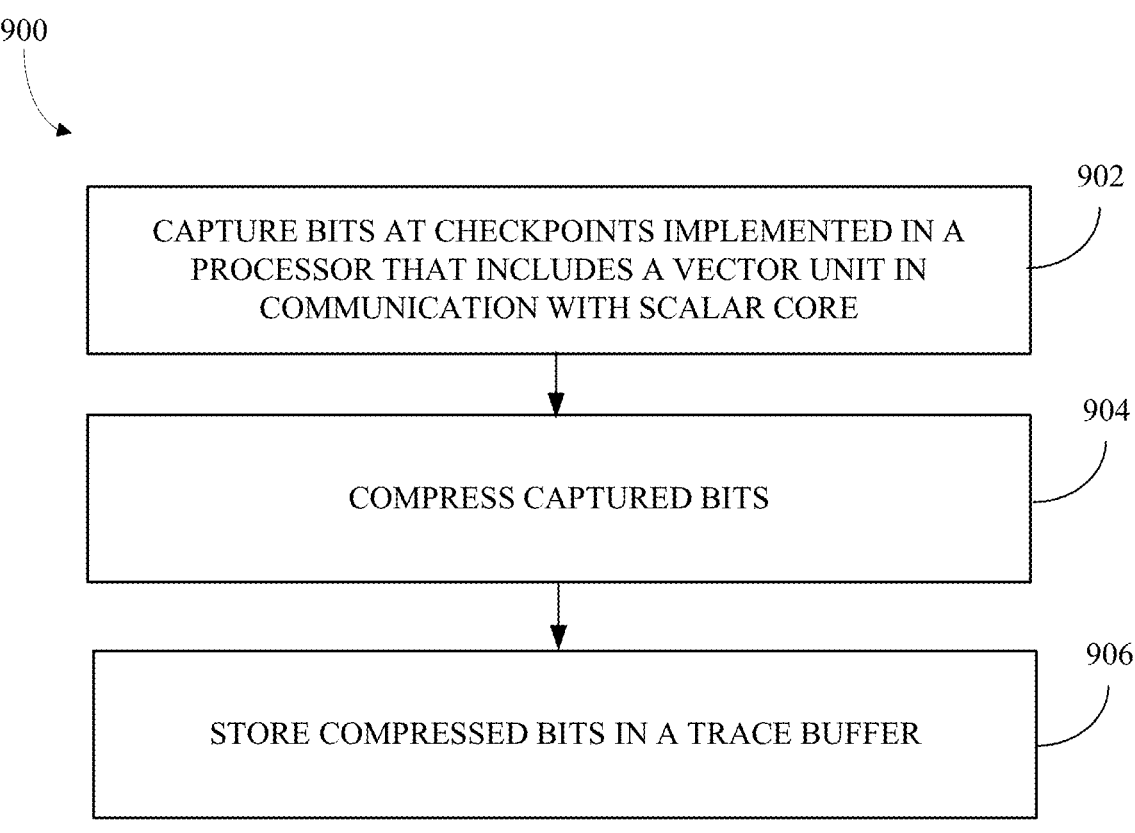
FIG. 9 is a flow chart of an example of a process for compressing bits captured by cycle accurate trace circuitry to reduce storage in a trace buffer.

FIG. 9 is a flow chart of an example of a process 900 for compressing bits captured by cycle accurate trace circuitry to reduce storage in a trace buffer. The process 900 includes capturing 902 multiple bits at checkpoints; compressing 904 the captured bits; and storing 906 the compressed bits in a trace buffer. For example, the process 900 may be implemented using the system 100 shown in FIG. 1, the system 200 shown in FIG. 2, and/or the system 300 shown in FIG. 3.

The process 900 includes capturing 902 multiple bits at checkpoints implemented in a scalar core and/or a vector unit implemented in silicon, such as checkpoints 140A through 140F shown in FIG. 1 or checkpoints 240A through 240F shown in FIG. 2. The checkpoints may include a first checkpoint including circuitry that sets a first bit for a clock cycle in which a vector instruction exits a vector instruction queue, and a second checkpoint including circuitry that sets a second bit for a clock cycle in which a vector instruction exits a vector execution unit. The bits may be captured during multiple clock cycles of a capture period. The bits may be captured in synchronization with a trace encoder, such as the trace encoder 308 shown in FIG. 3.

The process 900 also includes compressing 904 the captured bits to reduce bandwidth for routing the bits to a trace buffer and/or to reduce storage in a trace buffer, such as the cycle accurate trace buffer 106 shown in FIG. 1, the cycle accurate trace buffer 206 shown in FIG. 2, or the cycle accurate trace buffer 306 shown in FIG. 3. For example, a compression algorithm may be applied to compress multiple 32-bit words (each including six bits, corresponding to checkpoints 140A through 140F, captured for five clock cycles) into a single 32-bit word stored in a trace buffer. The compressed 32-bit word may be decompressed to restore the positions of bits for correlating to vector instructions.

The process 900 also includes storing 906 the compressed bits in a trace buffer. The compressed bits may be stored at predetermined addresses in the trace buffer for later decoding, such as a 32-bit word of a first set of compressed bits stored at a first address, followed by a 32-bit word of a second set of compressed bits stored at a second address following the first address, and so forth. The compressed bits may advantageously consume less storage in the trace buffer than non-compressed bits.

Figure 10:
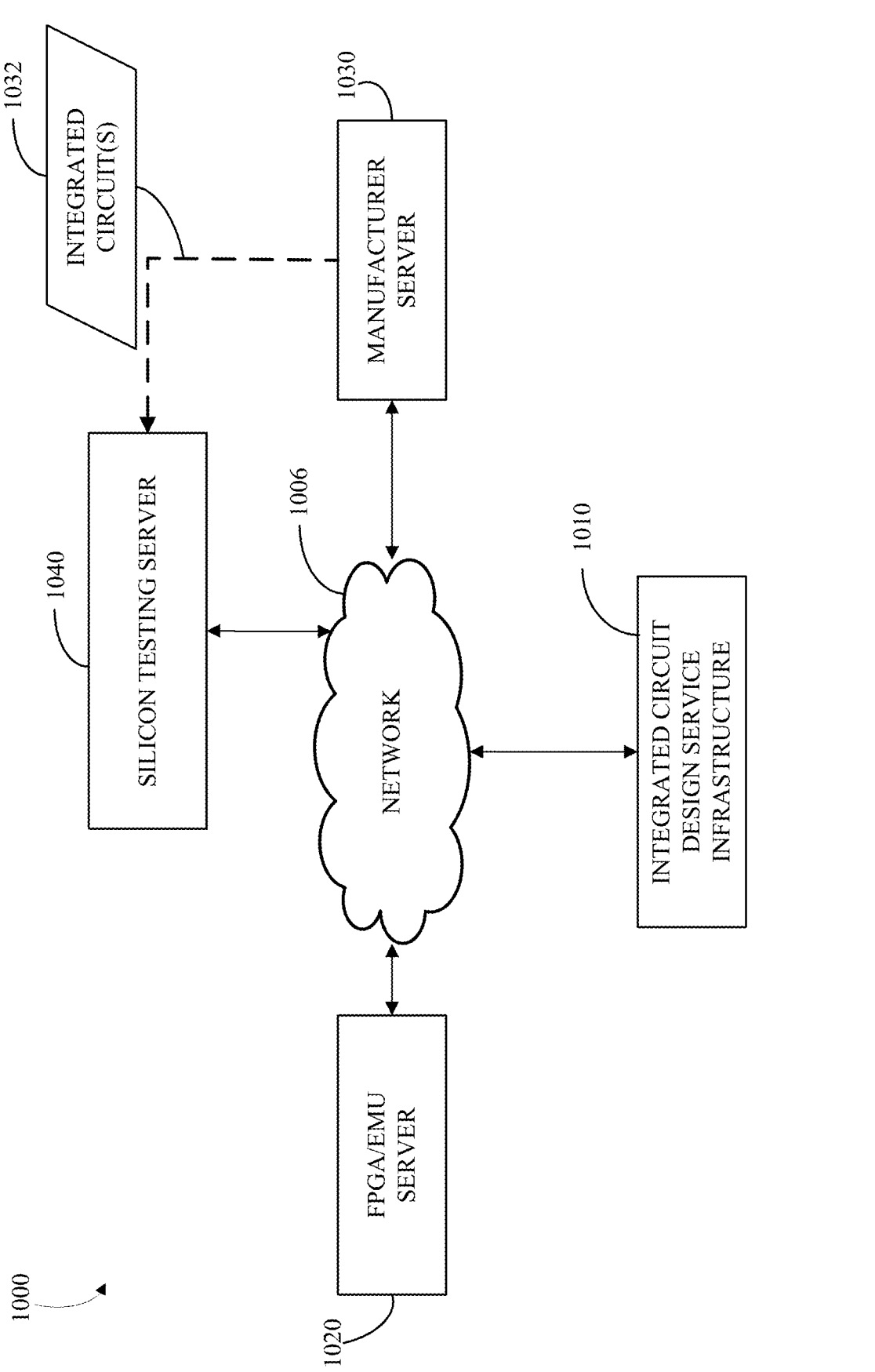
FIG. 10 is a block diagram of an example of a system for facilitating generation and manufacture of integrated circuits.

FIG. 10 is a block diagram of an example of a system 1000 for generation and manufacture of integrated circuits. The system 1000 includes a network 1006, an integrated circuit design service infrastructure 1010 (e.g., integrated circuit generator), a field programmable gate array (FPGA)/ emulator server 1020, and a manufacturer server 1030. For example, a user may utilize a web client or a scripting application program interface (API) client to command the integrated circuit design service infrastructure 1010 to automatically generate an integrated circuit design based on a set of design parameter values selected by the user for one or more template integrated circuit designs. In some implementations, the integrated circuit design service infrastructure 1010 may be configured to generate an integrated circuit design that includes the circuitry shown and described in FIGS. 1-3.

The integrated circuit design service infrastructure 1010 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 1010 may invoke (e.g., via network communications over the network 1006) testing of the resulting design that is performed by the FPGA/emulation server 1020 that is running one or more FPGAs or other types of hardware or software emulators. For example, the integrated circuit design service infrastructure 1010 may invoke a test using a field programmable gate array, pro-grammed based on a field programmable gate array emula-tion data structure, to obtain an emulation result. The field programmable gate array may be operating on the FPGA/ emulation server 1020, which may be a cloud server. Test results may be returned by the FPGA/emulation server 1020 to the integrated circuit design service infrastructure 1010 and relayed in a useful format to the user (e.g., via a web client or a scripting API client).

The integrated circuit design service infrastructure 1010 may also facilitate the manufacture of integrated circuits using the integrated circuit design in a manufacturing facil-ity associated with the manufacturer server 1030. In some implementations, a physical design specification (e.g., a graphic data system (GDS) file, such as a GDSII file) based on a physical design data structure for the integrated circuit is transmitted to the manufacturer server 1030 to invoke manufacturing of the integrated circuit (e.g., using manu-facturing equipment of the associated manufacturer). For example, the manufacturer server 1030 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 1010 supports multi-tenancy to allow multiple integrated circuit designs (e.g., from one or more users) to share fixed costs of manufacturing (e.g., reticle/mask gen-eration, and/or shuttles wafer tests). For example, the inte-grated circuit design service infrastructure 1010 may use a fixed package (e.g., a quasi-standardized packaging) that is defined to reduce fixed costs and facilitate sharing of reticle/ mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manu-facturer server 1030 may fabricate and/or test integrated circuits based on the integrated circuit design. For example, the associated manufacturer (e.g., a foundry) may perform optical proximity correction (OPC) and similar post-tape-out/pre-production processing, fabricate the integrated cir-cuit(s) 1032, update the integrated circuit design service infrastructure 1010 (e.g., via communications with a con-troller or a web application server) periodically or asynchro-nously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 1010 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 1032 (e.g., physical chips) are delivered (e.g., via mail) to a silicon testing service provider associated with a silicon testing server 1040. In some implementations, the resulting integrated circuit(s) 1032 (e.g., physical chips) are installed in a system controlled by the silicon testing server 1040 (e.g., a cloud server), making them quickly accessible to be run and tested remotely using network communications to control the operation of the integrated circuit(s) 1032. For example, a login to the silicon testing server 1040 controlling a manufactured integrated circuit(s) 1032 may be sent to the integrated circuit design service infrastructure 1010 and relayed to a user (e.g., via a web client). For example, the integrated circuit design service infrastructure 1010 may be used to control testing of one or more integrated circuit(s) 1032.

Referring again to FIG. 4, the system 400 may be used to facilitate generation of integrated circuits, to facilitate generation of a circuit representation for an integrated circuit, and/or for programming or manufacturing an integrated circuit. The system 400 may be used to implement the integrated circuit design service infrastructure 1010, and/or to generate a file that generates a circuit representation of an integrated circuit design that includes the circuitry shown and described in FIGS. 1-3.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in an apparatus that includes a scalar core; a vector unit in communication with the scalar core, the vector unit including a vector instruction queue that receives vector instructions from the scalar core, the vector unit further including a vector execution unit that executes vector instructions from the vector instruction queue; and a plurality of checkpoints in the vector unit including a first checkpoint including circuitry that sets a first bit for a first clock cycle in which a first vector instruction exits the vector instruction queue, and a second checkpoint including circuitry that sets a second bit for a second clock cycle in which a second vector instruction exits the vector execution unit. In some implementations, the apparatus includes a third checkpoint in the scalar core, wherein the third checkpoint includes circuitry that sets a third bit for a third clock cycle in which a third vector instruction dispatches to the vector unit. In some implementations, the apparatus includes checkpoints in the scalar core including a third checkpoint including circuitry that sets a third bit for a third clock cycle in which a third vector instruction dispatches to the vector unit, and a fourth checkpoint including circuitry that sets a fourth bit for the third clock cycle in which a fourth vector instruction dispatches to the vector unit. In some implementations, the first clock cycle and the second clock cycle correspond to a same clock cycle. In some implementations, the first vector instruction and the second vector instruction correspond to a same vector instruction. In some implementations, the apparatus includes a trace buffer that stores a plurality of bits corresponding to a clock cycle, the plurality of bits including a first bit captured at the first checkpoint and a second bit captured at the second checkpoint. In some implementations, the plurality of bits is compressed when stored in a trace buffer. In some implementations, the vector execution unit is a first vector execution unit that is a load unit, and further comprising a second vector execution unit that is a store unit, and wherein the second checkpoint includes circuitry that sets the second bit for the second clock cycle in which the second vector instruction exits the load unit or the store unit. In some implementations, the apparatus includes a third vector execution unit that is an arithmetic unit and a third checkpoint including circuitry that sets a third bit for a third clock cycle in which a third vector instruction exits the arithmetic unit.

In a second aspect, the subject matter described in this specification can be embodied in a method that includes capturing a plurality of bits at checkpoints implemented in a vector unit in communication with a scalar core, the vector unit including a vector instruction queue that receives vector instructions from the scalar core, the vector unit further including a vector execution unit that executes vector instructions from the vector instruction queue, the checkpoints including a first checkpoint including circuitry that sets a first bit for a first clock cycle in which a first vector instruction exits the vector instruction queue, and a second checkpoint including circuitry that sets a second bit for a second clock cycle in which a second vector instruction exits the vector execution unit. In some implementations, capturing the plurality of bits includes capturing a bit at a checkpoint implemented in the scalar core, wherein the checkpoints include a third checkpoint including circuitry that sets a third bit for a third clock cycle in which a third vector instruction dispatches to the vector unit. In some implementations, capturing the plurality of bits includes capturing bits at checkpoints implemented in the scalar core, wherein the checkpoints include a third checkpoint including circuitry that sets a third bit for a third clock cycle in which a third vector instruction dispatches to the vector unit, and a fourth checkpoint including circuitry that sets a fourth bit for the third clock cycle in which a fourth vector instruction dispatches to the vector unit. In some implementations, the method includes storing the plurality of bits in a trace buffer, wherein the plurality of bits corresponds to a same clock cycle. In some implementations, the method includes compressing the plurality of bits stored in the trace buffer. In some implementations, the method includes executing a trace encoder to associate a vector instruction obtained from a scalar core with a bit obtained from a checkpoint. In some implementations, the method includes outputting to a display a trace of the vector instruction, wherein the trace indicates a number of clock cycles between the first checkpoint and the second checkpoint.

In a third aspect, the subject matter described in this specification can be embodied, at least in part, in a non-transitory computer-readable storage medium that includes instructions that, when executed by a processor, causes the processor to associate a vector instruction obtained from a scalar core with a bit obtained from a checkpoint implemented in a vector unit in communication with a scalar core, wherein the vector unit includes a vector instruction queue that receives vector instructions from the scalar core, wherein the vector unit further includes a vector execution unit that executes vector instructions from the vector instruction queue, and wherein the checkpoints include a first checkpoint including circuitry that sets a first bit for a first clock cycle in which a first vector instruction exits the vector instruction queue, and a second checkpoint including circuitry that sets a second bit for a second clock cycle in which a second vector instruction exits the vector execution unit. In some implementations, the non-transitory computer-readable storage medium includes instructions that, when executed by the processor, causes the processor to associate the vector instruction with a bit obtained from a checkpoint implemented in the scalar core, wherein the checkpoints include a third checkpoint including circuitry that sets a second bit for a third clock cycle in which a third vector instruction dispatches to the vector unit. In some implementations, the non-transitory computer-readable storage medium includes instructions that, when executed by the processor, causes the processor to compress the bit with a plurality of bits stored in a trace buffer. In some implementations, the non-transitory computer-readable storage medium includes instructions that, when executed by the processor, causes the processor to display a trace of the vector instruction, wherein the trace indicates a number of clock cycles between the first checkpoint and the second checkpoint.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus comprising:
a scalar core;
a vector unit in communication with the scalar core, the vector unit including a vector instruction queue that receives vector instructions from the scalar core, the vector unit further including a vector execution unit that executes vector instructions from the vector instruction queue;
a plurality of checkpoints in the vector unit including a first checkpoint including first hardware circuitry that sets a first bit for a first clock cycle in which a first vector instruction exits the vector instruction queue, and a second checkpoint including second hardware circuitry that is separate from the first hardware circuitry and that sets a second bit for a second clock cycle in which a second vector instruction exits the vector execution unit; and
a trace buffer that stores a plurality of bits, wherein at least one bit of the plurality of bits stored in the trace buffer is compressed.

2. The apparatus of claim 1, further comprising a third checkpoint in the scalar core, wherein the third checkpoint includes circuitry that sets a third bit for a third clock cycle in which a third vector instruction dispatches to the vector unit.

3. The apparatus of claim 1, further comprising checkpoints in the scalar core including a third checkpoint including circuitry that sets a third bit for a third clock cycle in which a third vector instruction dispatches to the vector unit, and a fourth checkpoint including circuitry that sets a fourth bit for the third clock cycle in which a fourth vector instruction dispatches to the vector unit.

4. The apparatus of claim 1, wherein the first clock cycle and the second clock cycle correspond to a same clock cycle.

5. The apparatus of claim 1, wherein the first vector instruction and the second vector instruction correspond to a same vector instruction.

6. The apparatus of claim 1, wherein the plurality of bits corresponds to a clock cycle and includes the first bit captured at the first checkpoint and the second bit captured at the second checkpoint.

7. The apparatus of claim 6, wherein the plurality of bits is compressed when stored in the trace buffer.

8. The apparatus of claim 1, wherein the vector execution unit is a first vector execution unit that is a load unit, and further comprising a second vector execution unit that is a store unit, and wherein the second checkpoint includes circuitry that sets the second bit for the second clock cycle in which the second vector instruction exits the load unit or the store unit.

9. The apparatus of claim 8, further comprising a third vector execution unit that is an arithmetic unit and a third checkpoint including circuitry that sets a third bit for a third clock cycle in which a third vector instruction exits the arithmetic unit.

10. A method comprising:

capturing a plurality of bits at checkpoints implemented in a vector unit in communication with a scalar core, the vector unit including a vector instruction queue that receives vector instructions from the scalar core, the vector unit further including a vector execution unit that executes vector instructions from the vector instruction queue, wherein the checkpoints include a first checkpoint including first hardware circuitry that sets a first bit for a first clock cycle in which a first vector instruction exits the vector instruction queue, and a second checkpoint including second hardware circuitry that is separate from the first hardware circuitry and that sets a second bit for a second clock cycle in which a second vector instruction exits the vector execution unit; and executing a trace encoder to associate a vector instruction obtained from the scalar core with a bit obtained from a checkpoint.

11. The method of claim 10, wherein capturing the plurality of bits includes capturing a bit at a checkpoint implemented in the scalar core, wherein the checkpoints include a third checkpoint including circuitry that sets a third bit for a third clock cycle in which a third vector instruction dispatches to the vector unit.

12. The method of claim 10, wherein capturing the plurality of bits includes capturing bits at checkpoints implemented in the scalar core, wherein the checkpoints include a third checkpoint including circuitry that sets a third bit for a third clock cycle in which a third vector instruction dispatches to the vector unit, and a fourth checkpoint including circuitry that sets a fourth bit for the third clock cycle in which a fourth vector instruction dispatches to the vector unit.

13. The method of claim 10, further comprising storing the plurality of bits in a trace buffer, wherein the plurality of bits corresponds to a same clock cycle.

14. The method of claim 13, further comprising compressing the plurality of bits stored in the trace buffer.

15. The method of claim 10, further comprising outputting to a display a trace of the vector instruction, wherein the trace indicates a number of clock cycles between the first checkpoint and the second checkpoint.

16. A non-transitory computer-readable storage medium that includes instructions that, when executed by a processor, causes the processor to:

associate a vector instruction obtained from a scalar core with a bit obtained from a checkpoint of a plurality of checkpoints implemented in a vector unit in communication with the scalar core, wherein the vector unit includes a vector instruction queue that receives vector instructions from the scalar core, wherein the vector unit further includes a vector execution unit that executes vector instructions from the vector instruction queue, and wherein the plurality of checkpoints includes a first checkpoint including first hardware circuitry that sets a first bit for a first clock cycle in which a first vector instruction exits the vector instruction queue, and a second checkpoint including second hardware circuitry that is separate from the first hardware circuitry and that sets a second bit for a second clock cycle in which a second vector instruction exits the vector execution unit; and display a trace of the vector instruction, wherein the trace indicates a number of clock cycles between the first checkpoint and the second checkpoint.

17. The non-transitory computer-readable storage medium of claim 16, further comprising instructions that, when executed by a processor, causes the processor to associate the vector instruction with a bit obtained from a checkpoint implemented in the scalar core, wherein the checkpoints include a third checkpoint including circuitry that sets a third bit for a third clock cycle in which a third vector instruction dispatches to the vector unit.

18. The non-transitory computer-readable storage medium of claim 16, further comprising instructions that, when executed by a processor, causes the processor to compress the bit with a plurality of bits stored in a trace buffer.

19. The non-transitory computer-readable storage medium of claim 16, wherein the plurality of checkpoints further includes a third checkpoint in the scalar core, wherein the third checkpoint includes circuitry that sets a third bit for a third clock cycle in which a third vector instruction dispatches to the vector unit.

20. The non-transitory computer-readable storage medium of claim 16, wherein the plurality of checkpoints further includes a third checkpoint including circuitry that sets a third bit for a third clock cycle in which a third vector instruction dispatches to the vector unit, and a fourth checkpoint including circuitry that sets a fourth bit for the third clock cycle in which a fourth vector instruction dispatches to the vector unit.

* * * * *